United States Patent
Drost et al.

(10) Patent No.: US 10,981,280 B2
(45) Date of Patent: Apr. 20, 2021

(54) MECHANIZE RETRIEVAL TOOL WITH CAMERA

(71) Applicant: SENSOR NETWORKS, INC, Boalsburg, PA (US)

(72) Inventors: Jeffrey D. Drost, Hackettstown, NJ (US); Bruce A. Pellegrino, Far Hills, NJ (US)

(73) Assignee: Sensor Networks, Inc., Boalsburg, PA (US)

( * ) Notice: Subject to any disclaimer, the term of this patent is extended or adjusted under 35 U.S.C. 154(b) by 0 days.

(21) Appl. No.: 16/162,267

(22) Filed: Oct. 16, 2018

(65) Prior Publication Data

US 2019/0118389 A1 Apr. 25, 2019

Related U.S. Application Data

(60) Provisional application No. 62/572,815, filed on Oct. 16, 2017.

(51) Int. Cl.
*B25J 15/02* (2006.01)
*B25J 13/06* (2006.01)
*B25J 19/02* (2006.01)
*B25J 15/08* (2006.01)

(52) U.S. Cl.
CPC ............ *B25J 15/022* (2013.01); *B25J 13/06* (2013.01); *B25J 15/08* (2013.01); *B25J 19/023* (2013.01)

(58) Field of Classification Search
CPC ........ B25J 15/022; B25J 13/06; B25J 19/023; B25J 15/08
See application file for complete search history.

(56) References Cited

U.S. PATENT DOCUMENTS

| | | | | |
|---|---|---|---|---|
| 2,623,152 A | * | 12/1952 | Ammon | B23K 1/0004 219/234 |
| 7,269,892 B2 | * | 9/2007 | Miyazaki | B23K 3/0369 29/739 |
| 7,439,727 B2 | * | 10/2008 | DeFlorio | G01R 1/06788 324/149 |
| 7,456,642 B2 | * | 11/2008 | Saulnier | G01R 1/06788 324/755.05 |
| 8,152,213 B2 | * | 4/2012 | Fortune | B25B 9/02 294/99.2 |
| 8,544,919 B2 | * | 10/2013 | Oh | A01D 11/00 294/115 |
| 9,251,921 B2 | | 2/2016 | Dean | |

(Continued)

*Primary Examiner* — Stephen A Vu
(74) *Attorney, Agent, or Firm* — FisherBroyles LLP

(57) ABSTRACT

A retrieval device for retrieving items within a confined space with limited access, said device comprising: (a) an elongated body having a front and rear and a longitudinal axis; (b) a clamping mechanism comprising at least a set of jaws disposed at said front, said jaws being configured to actuate between closed and open positions, said clamping mechanism also comprising at least one actuating member connected to said jaws and at least partially disposed in said body; (c) an actuator laterally offset from said axis and beside said at least one actuating member, said actuator operatively connected to said at least one actuating member to actuate said jaws between said closed and opened positions; and (d) at least one camera disposed proximate said motor and offset from said axis, said at least one camera having a field of view of at least a portion of said jaws.

23 Claims, 9 Drawing Sheets

(56) References Cited

U.S. PATENT DOCUMENTS

| | | | | |
|---|---|---|---|---|
| 9,828,734 | B1* | 11/2017 | Bieberstein | ........... E01H 1/1206 |
| 9,832,980 | B2 | 12/2017 | Kovarik | |
| 10,265,862 | B1* | 4/2019 | Alqasemi | ............. B25J 15/0038 |
| 2010/0155485 | A1* | 6/2010 | Tan | .................... G06K 7/10702 |
| | | | | 235/462.42 |
| 2014/0249448 | A1 | 9/2014 | Furlong | |
| 2018/0036065 | A1* | 2/2018 | Yates | ................ A61B 18/1482 |

\* cited by examiner

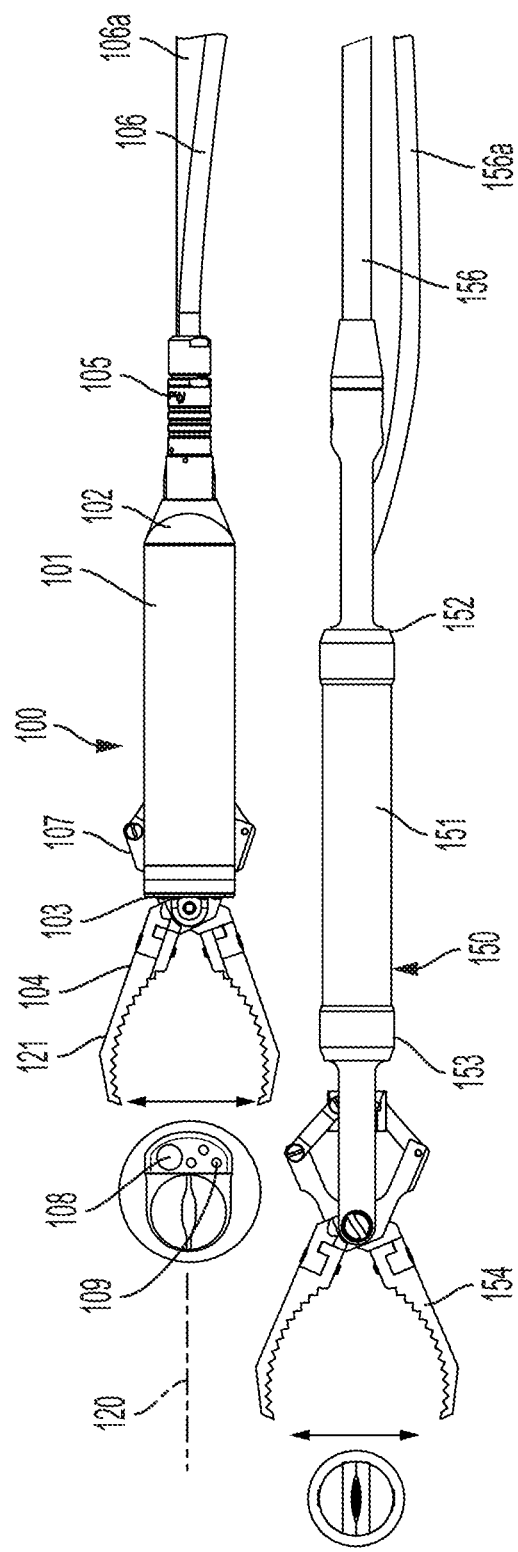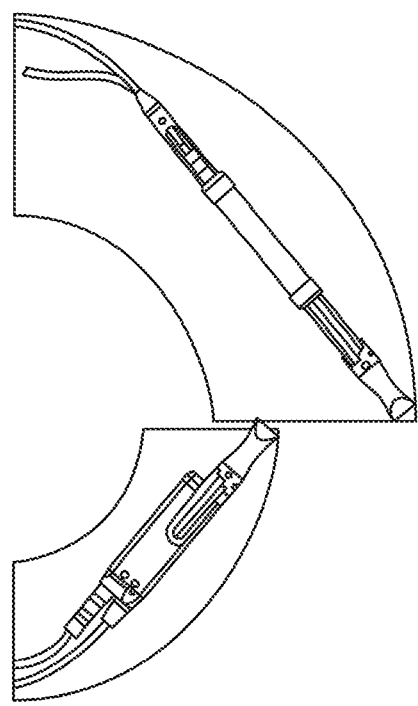

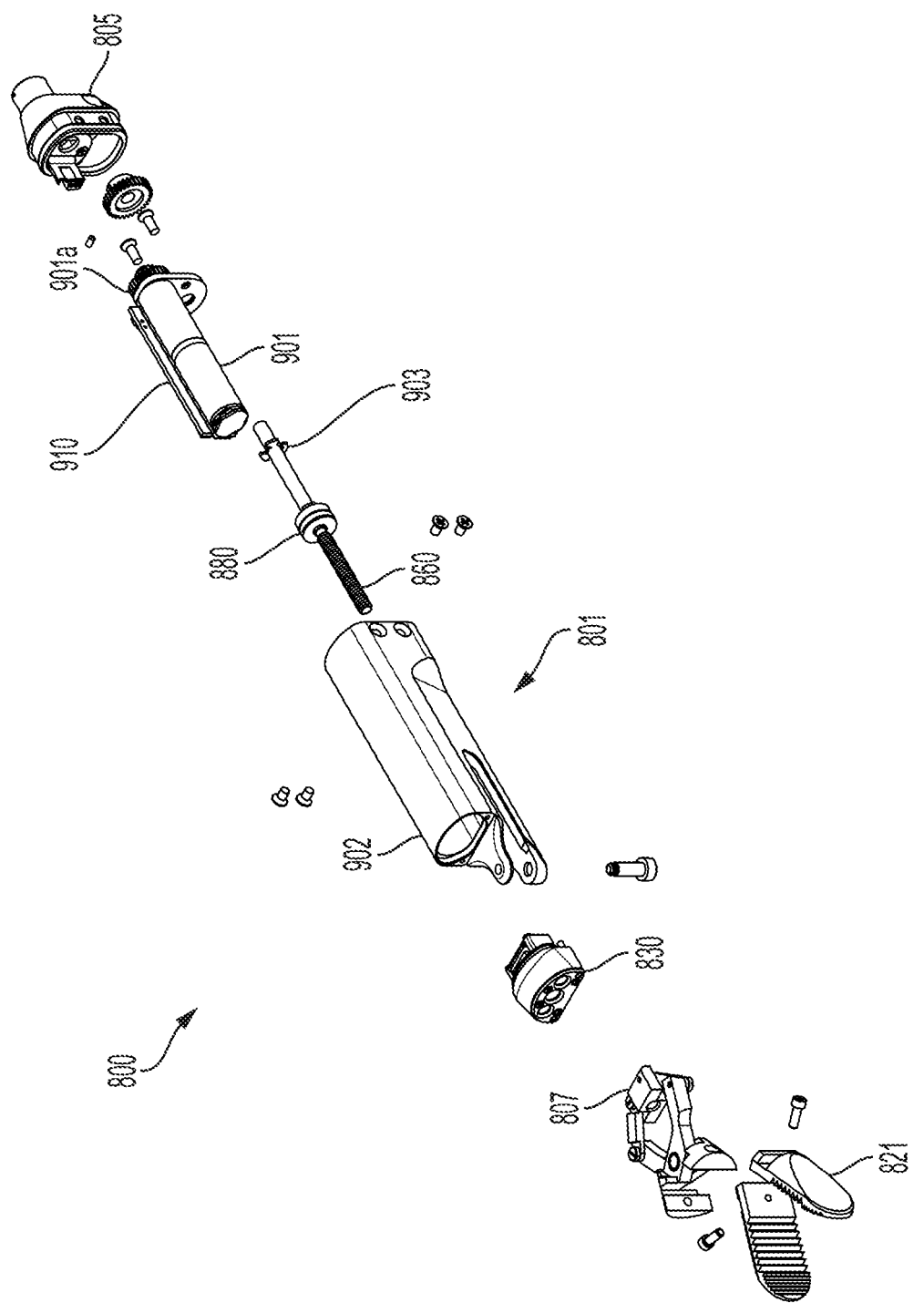

MECHANIZE RETRIEVAL TOOL WITH CAMERA

REFERENCE TO RELATED APPLICATION

This application claims priority to US Provisional Application No. 62/572,815, filed Oct. 16, 2017, which is hereby incorporated by reference in its entirety.

FIELD OF INVENTION

The present invention relates, generally, to a retrieval tool for retrieving objects, such as debris and tools, in confined spaces having limited access, such as found in pipes and equipment. More specifically, the invention relates to a retrieval tool having a reduced length for maneuverability and a camera for imaging articles for retrieval.

BACKGROUND

There are many situations requiring a retrieval tool to recover an object in a confined space, such as a pipe or a piece of machinery. For example, frequently tools are dropped down into machinery or pipes and a retrieval tool is needed to go through a circuitous path to reach the dropped tool. A conventional retrieval tool 150 is shown in FIG. 1. This is a commercially available tool and comprises an elongated body 151 having jaws 154 at the front end 153 and a cable 156 extending from the rear end 152.

Although this tool has been successful in retrieving articles, Applicants have nevertheless identified that it tends to lack maneuverability. For example, the length of the device inhibits its ability to turn through elbows. For example, the retrieval tool 150 depicted in FIG. 1 requires a minimum 6" elbow to pass as shown in FIG. 2. Additionally, a camera typically must accompany the tool to image the object to be retrieved. Thus, the user must maneuver not only the tool around bends, but also an attached camera with its own cable 156a, thereby exacerbating the maneuverability issue.

Therefore, applicants have identified a need for a more maneuverable tool. The present invention fulfills that need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicants recognize that the maneuverability of a retrieval tool can be improved by shortening the length of the retrieval tool to decrease its turning radius and incorporating a camera into the retrieval tool to eliminate additional cables. Moreover, Applicants recognize that these two features can be added synergistically. Specifically, by mounting the actuator (e.g., motor) in a side-by-side configuration with the clamping mechanism of the tool, the length of the tool is significantly reduced. Furthermore, because the actuator is offset from the centerline of the tool, it provides a radial offset for the camera too. Having a camera that is radially offset from the centerline is important to provide perspective/depth perception in relation to the jaws.

Accordingly, in one embodiment, the invention relates to a retrieval device for retrieving items within a confined space with limited access, the device comprising: (a) an elongated body having a front and rear and a longitudinal axis; (b) an electrical interface disposed at the rear, the electrical interface being configured for connection to a cable; (c) a clamping mechanism comprising at least a set of jaws disposed at the front, the jaws being configured to actuate between closed and open positions, the clamping mechanism also comprising at least one actuating member connected to the jaws and at least partially disposed in the body; (d) an actuator (e.g., motor) laterally offset from the axis and beside the at least one actuating member, the actuator operatively connected to the at least one actuating member to actuate the jaws between the closed and opened positions; (e) at least one camera disposed proximate the actuator and offset from the axis, the at least one camera having a field of view of at least a portion of the jaws; and (f) at least one light configured to illuminate the field of view.

BRIEF DESCRIPTION OF FIGURES

FIG. 1 shows a side-by-side comparison of one embodiment of the retrieval tool of the present invention to a prior art retrieval tool.

FIG. 2 illustrates the increased maneuverability of the shortened retrieval tool of the present invention compared to the prior art retrieval tool.

FIG. 8b shows a cross-section of the embodiment of FIG. 8a.

FIG. 9 shows an exploded view of the embodiment of FIG. 8a.

DETAILED DESCRIPTION

Figure 3B:
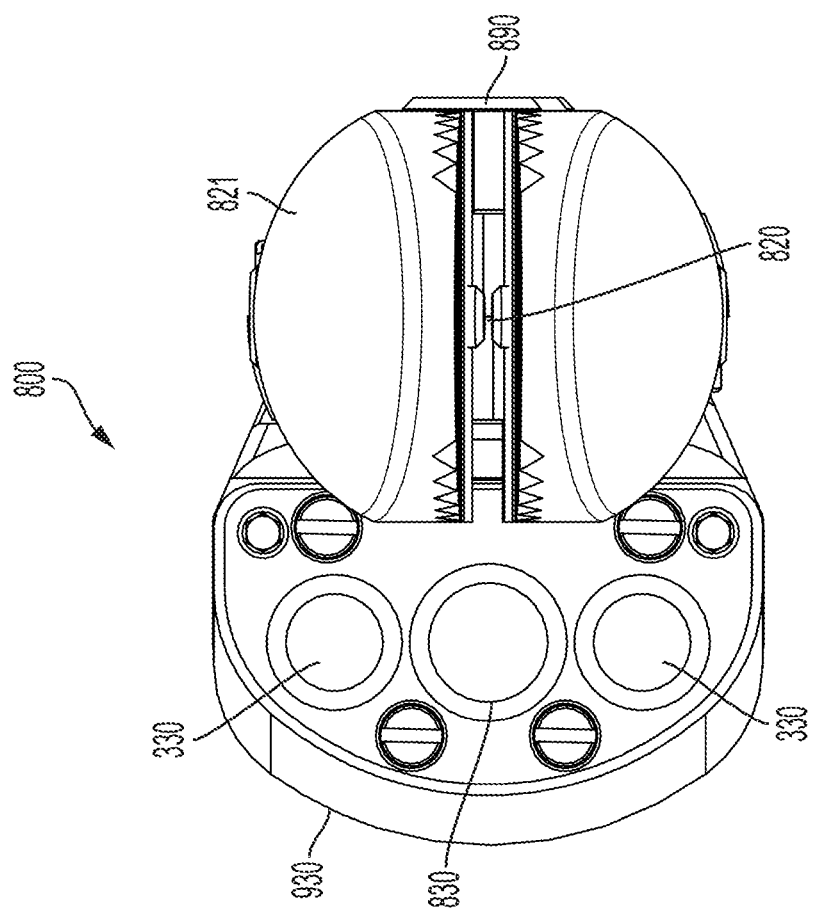
FIG. 3B shows a front view of an alternative embodiment of the retrieval tool shown in FIG. 8.

Referring to FIGS. 1, 8a, 8b, and 9 embodiments of the retrieval tool 100, 800 of the present invention are shown. The device 100, 800 comprises (a) an elongated body 101, 801 having a front 103, 803 and rear 102, 802 and a longitudinal axis 120, 820; (b) an electrical interface 105, 805 disposed at the rear 102, 802 and configured for connection to a cable 106; (c) a clamping mechanism 104, 804 comprising at least a set of jaws 121, 821 disposed at the front, the jaws being configured to actuate between closed and open positions, the clamping mechanism also comprising at least one actuating member 107, 807 connected to the jaws and at least partially disposed in the body; (d) an actuator (e.g., motor) 901 laterally offset from the axis and operatively connected to the at least one actuating member 107, 807 to actuate the jaws between the closed and opened positions; (e) at least one camera 108, 830 disposed proximate the actuator and offset from the axis, the at least one camera having a field of view of at least a portion of the jaws; and (f) at least one light configured to illuminate the field of view (see FIGS. 3A and 3B, 109, 330). These features are described below in greater detail and with respect to alternative embodiments.

As mentioned above, Applicants recognize that the maneuverability of a retrieval tool can be improved by shortening the length of the retrieval tool to decrease its turning radius and incorporating a camera into the retrieval tool to eliminate additional cables. To this end, rather than mounting the actuator axially with the actuation/clamping mechanism as is conventionally done, the retrieval tool of the present invention mounts the actuator alongside the clamping mechanism. By mounting the actuator in a side-by-side configuration with the clamping mechanism, the length of the tool is significantly reduced. For example, referring to FIG. 1, because the actuator is disposed alongside the clamping mechanism, rather than behind it as in the prior art device 150, the tool has a reduced length as shown in the side-by-side comparison of the devices in FIG. 1. This has a significant effect on its maneuverability as shown in FIG. 2. FIG. 2 illustrates how the tool of the present invention can turn within a 4" elbow, compared to the prior art tool, which requires a 6" elbow to turn. Additionally, because the actuator no longer dictates the length of the device, the configuration of the present invention allows for the use of a larger actuator to increase the gripping power without affecting the length of the device.

Moreover, Applicants realize other synergistic benefits of mounting the actuator alongside the clamping mechanism. Because the actuator is offset from the centerline of the tool, it provides a radial offset for the camera 108, 830 too. Having a camera that is radially offset from the centerline is important to provide perspective/depth perception in relation to the jaws.

In one embodiment, the clamping mechanism 104, 804 comprises at least a set of jaws 121 and one or more actuating members 107, 807 connected to the jaws. As used herein, actuating member(s) refers to any component of the clamping system which, when moved, affects the movement of the jaws. The actuating members may be discrete from the jaws or they may be integrally formed with the jaws. It should be understood that various clamping mechanisms can be used, including, for example, scissor mechanisms and direct jaw actuation mechanisms. In one embodiment, the jaws define a pivot axis 890 which essentially intersects the longitudinal axis 820 at essentially a right angle. In one embodiment, the jaws are configured to rotate about the axis 120, 820.

The actuator 901 moves the actuating member(s). The actuator may be any known device for translating electrical, pneumatic or hydraulic power into linear or rotational movement. For example, the actuator may be a linear actuator (e.g. a solenoid, linear motor, hydraulics) or a rotary actuator (e.g. a rotational motor). Still other embodiments will be obvious to those of skill in the art in light of this disclosure.

Figure 8A:
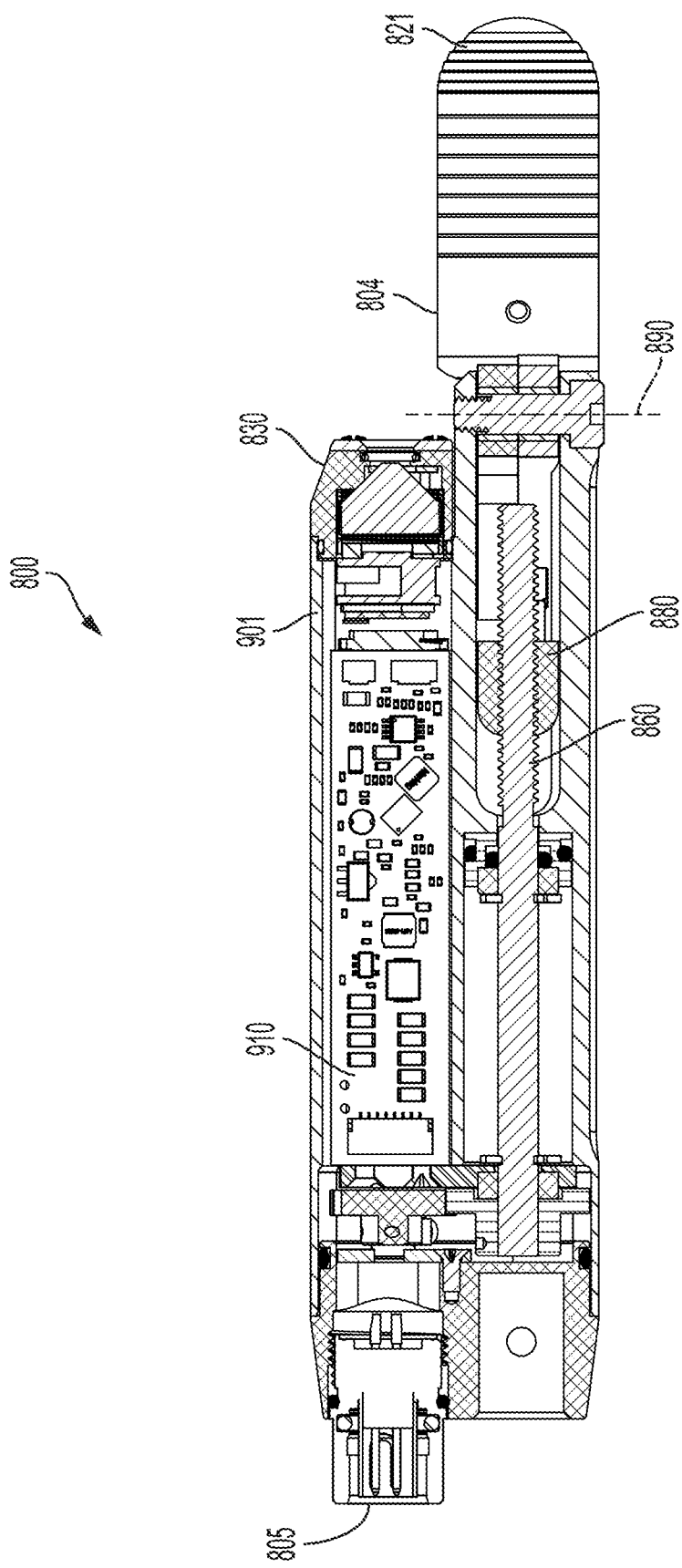
FIG. 8a shows a different embodiment of the retrieval tool of the present invention.
Figure 8B:
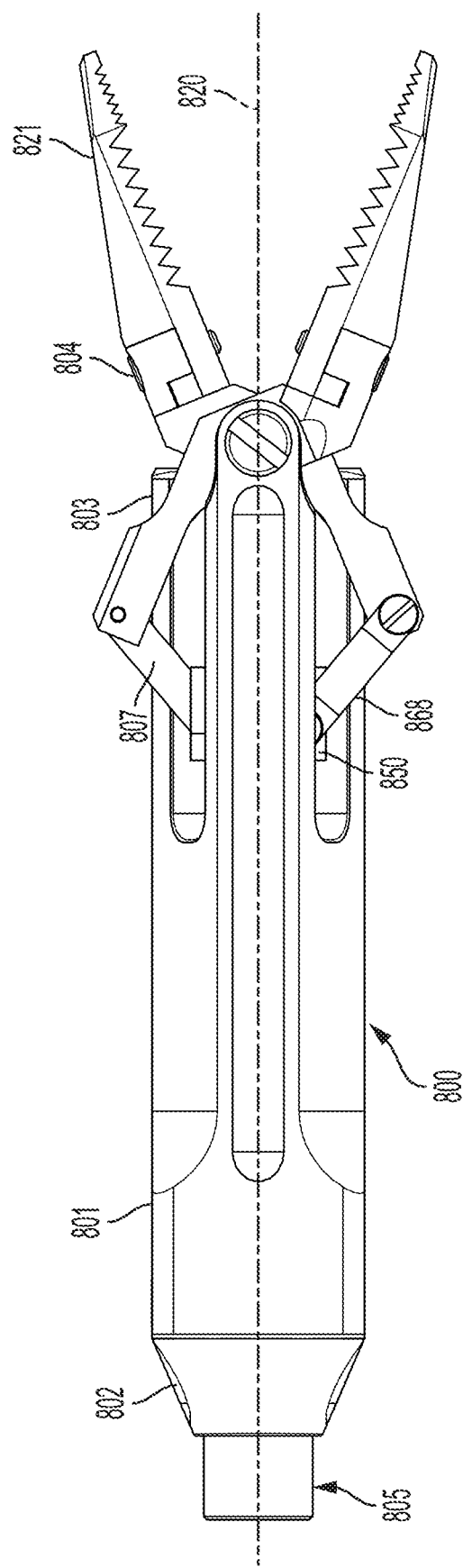

Referring to FIGS. 8A and 8B, in one embodiment, the actuation mechanism comprises a traditional scissor mechanism 868. The scissor mechanism is well known and involves moving proximate ends 850 of hinged actuating members 807 either axially (i.e., back/forth) or radially (i.e., inwardly/outwardly), thereby causing distal ends of the hinged actuating members to move in response. More specifically, in one embodiment, the proximate ends 850 of the actuating members are operatively connected to a threaded member 880, which is threadably engaged with an axial screw 860. The screw in one embodiment is coincident with the axis 120, 820. In this embodiment, the actuator is a gear motor (901, FIG. 9), which is mechanically engaged with a pinion 903 on screw 860, such that, when the motor rotates, the screw 860 rotates causing the threaded member 880 to move axially forwardly/rearwardly along the screw 860. The actuating members, which are attached to the threaded member, cause the jaws 821 to open and close as the threaded member moves forward and rearward, respectively.

Figure 4:
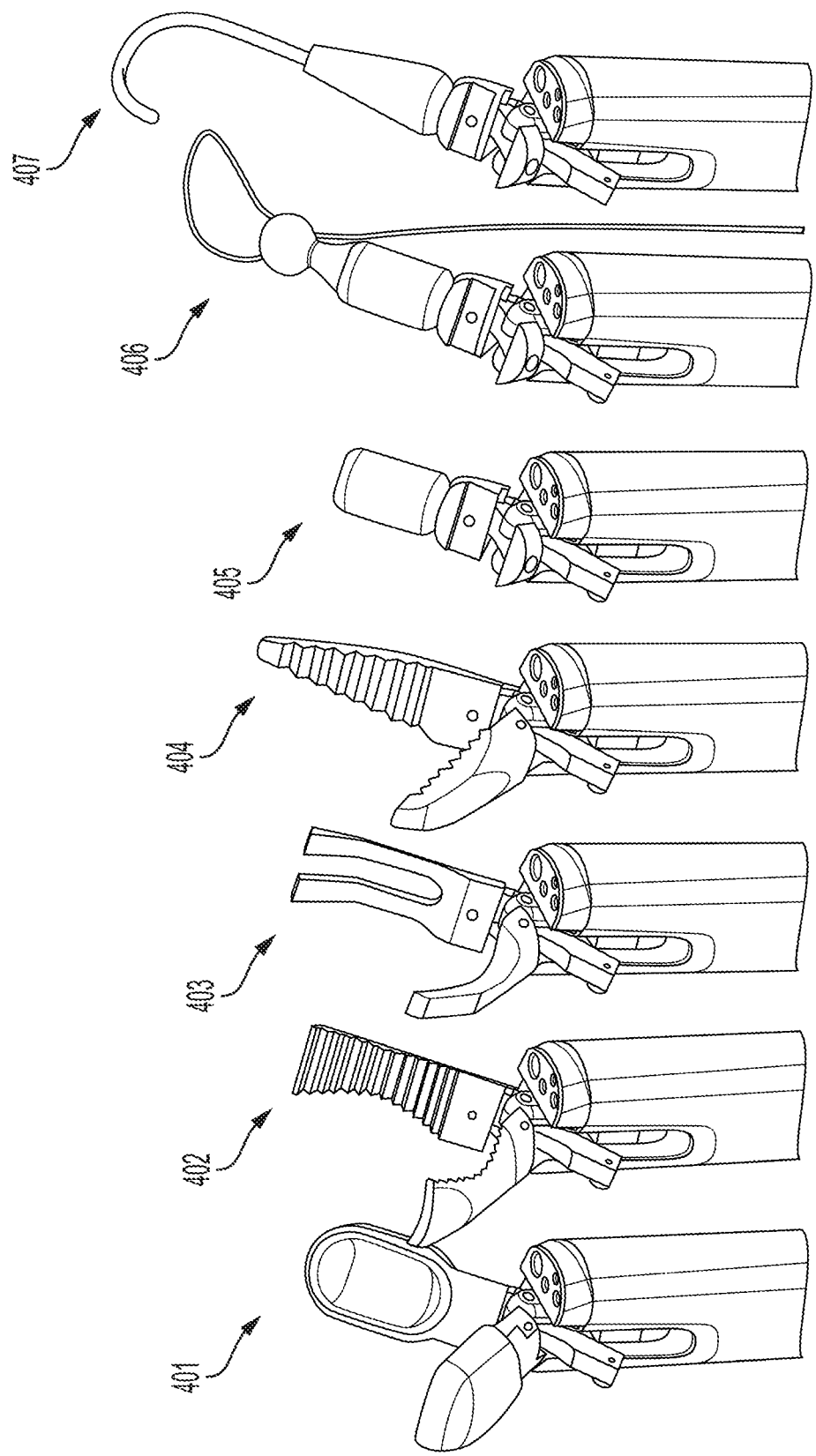
FIG. 4 shows the different jaw attachments that can be attached to the retrieval tool of FIG. 1.

In one embodiment, the jaws are interchangeable. For example, referring to FIG. 4, in one embodiment, the jaws comprise different jaw attachments for providing different functionality. The following are just examples of the different attachments that can be used: sampling cups 401, curved serrated jaws 402, fork & tine 403, pliers 404, magnet 405, snare/lasso 406, and hook 407. In one embodiment, a quick-release fitting is used on the jaws that allows anything with the mating socket to attach to the jaws. This is shown in right three images of the jaws—i.e., the magnet, snare and hook all attach this way.

Figure 3A:
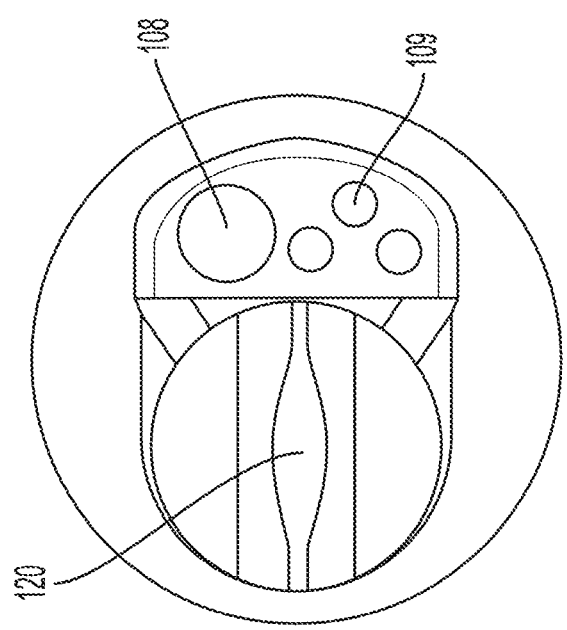
FIG. 3A shows a front view of one embodiment of the retrieval tool shown in FIG. 1 with the jaws closed.

The device also comprises at least one camera disposed proximate the actuator and offset from the axis. Referring to FIGS. 3A and 3B, two embodiments of the camera configuration are shown. In each embodiment, the camera is offset from the axis 120, 820 of the tool. In FIG. 3A, the camera 108 is also offset from the pivot axis of the jaws. Such an embodiment may be preferred if the camera electronics are alongside the actuator. Alternatively, as shown in FIG. 3B, the camera 830 is aligned with the pivot axis 890 of the jaws 821. Such an embodiment may be preferred if the camera module is forward of the actuator.

In one embodiment, the camera has an optical axis which is angled with respect to the axis 120, 820 of the tool, thereby providing depth perception. In another embodiment, the camera has an optical axis which is essentially parallel to the axis of the tool. In one embodiment, the at least one camera is configured with a field of view to include at least one of the jaws when in the closed position or the space in front of the jaws. In one embodiment, the field of view comprises both the jaws when in the closed position and the space in front of the jaws. In one embodiment, the at least one camera comprises two cameras, one having a field of view of the jaws when in the closed position and the other having a field of view of the space in front of the jaws. In an alternative embodiment, the at least one camera has an actuatable lens mechanism to provide two fields of view, one having a field of view of the jaws when in the closed position, and the other having a field of view of the space in front of the jaws.

In each embodiment, the camera has a field of view of at least a portion of the jaws and at least one light 109, 330 configured to illuminate the field of view. In one embodiment, the camera and the lights are packaged in a module 930 as shown in FIG. 9.

Figure 10:
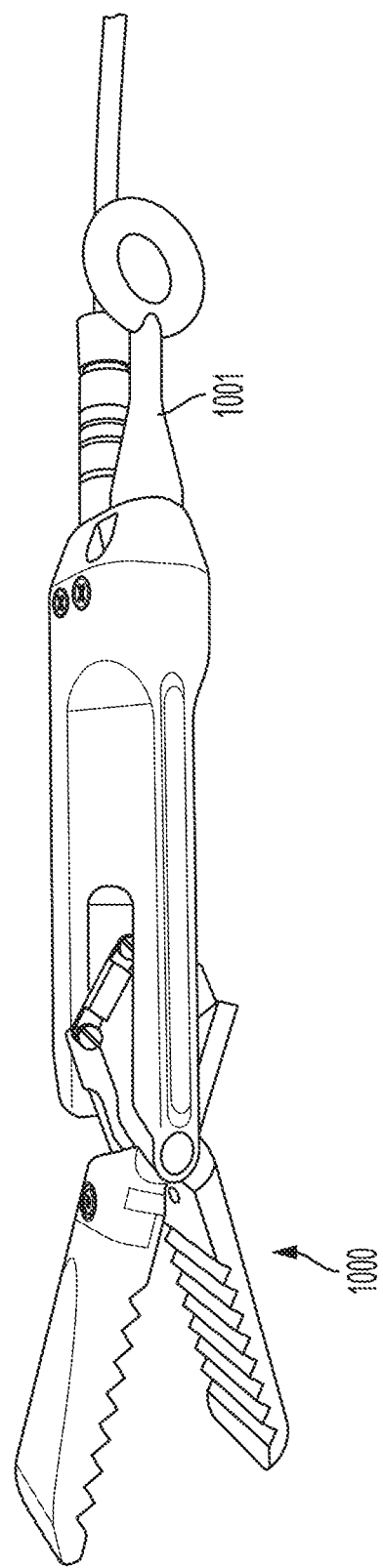
FIG. 10 shows an alternative embodiment of the device with a lifting hook.

The device also comprises a cable interface 105, 805 disposed at the rear 102, 802, and is configured for connection to a cable 106. In this embodiment, the cable 106 is a mechanical cable which is used for maneuvering the tool 100. In this embodiment, a second electrical cable 106a is also used to provide power and control to tool 100. Although two separate cables are depicted here, it should be understood that the mechanical and electrical functionality may be combined in a single cable. Additionally, in one embodiment shown in FIG. 10, the device 1000 comprises a lifting hook 1001, which may be desirable in applications in which the retrieval tool is being lowered into an apparatus, so that the weight of the tool is supported by a support cable rather than the electrical cable.

Figure 5:
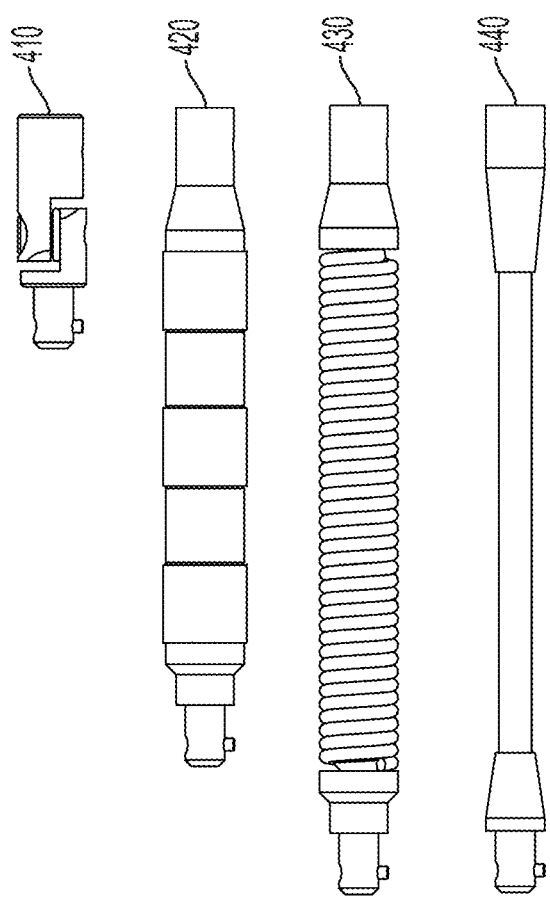
FIG. 5 shows the different couplings that can be used to attach the cable to the retrieval tool of FIG. 1.

In one embodiment, the cable interface 105 is a universal quick-release type and it allows multiple types of "motivators" to attach as shown in FIG. 5, including an adjustable elbow 410, a rubber flex joint 420, a spring flex joint 430, or a 6 in extension 440. One can therefore choose between something flexible to something stiff, and from something straight to something curved which would help snake the tool into position and align the jaws with the object to be retrieved.

Figure 7:
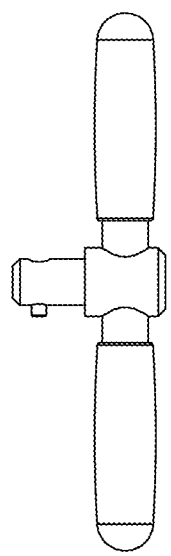
FIG. 7 shows a handle attachment that can be attached to the cable to facilitate rotating the cable and thus the retrieval tool.

In one embodiment, the mechanical cable can be combined with a T-handle as shown in FIG. 7 to aid in rotating the cable to thereby rotate the tool.

Referring to FIG. 9, an exploded view of the device 800 is shown. In this embodiment, the body 801 comprises a housing 902, which functions to hold the clamping mechanism (which, in this embodiment, includes the jaws 821, actuating members 807, and screw 860). These components are aligned essentially axially in the housing 902. Offset from the axis 820 of the device is the motor 901 for actuating the jaws and the camera/lighting module 930 (module 930 is also shown in detail in FIG. 3B). In this particular embodiment, the motor has gearing 901a for interfacing with the pinion 903 on the screw member 860. This embodiment also comprises a circuit board 910 for controlling the electronics of the device. The circuit board is mounted alongside the motor (see also FIG. 8 a). At the rear of this embodiment is the electrical interface 805.

Figure 6A:
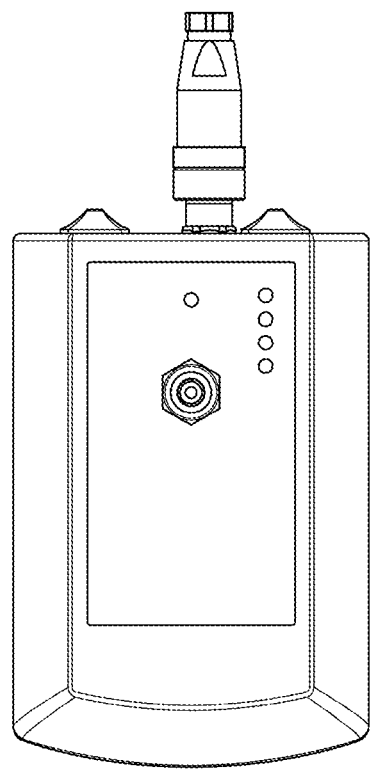
FIG. 6A shows the conventional operator's control device for a conventional retrieval tool.
Figure 6B:
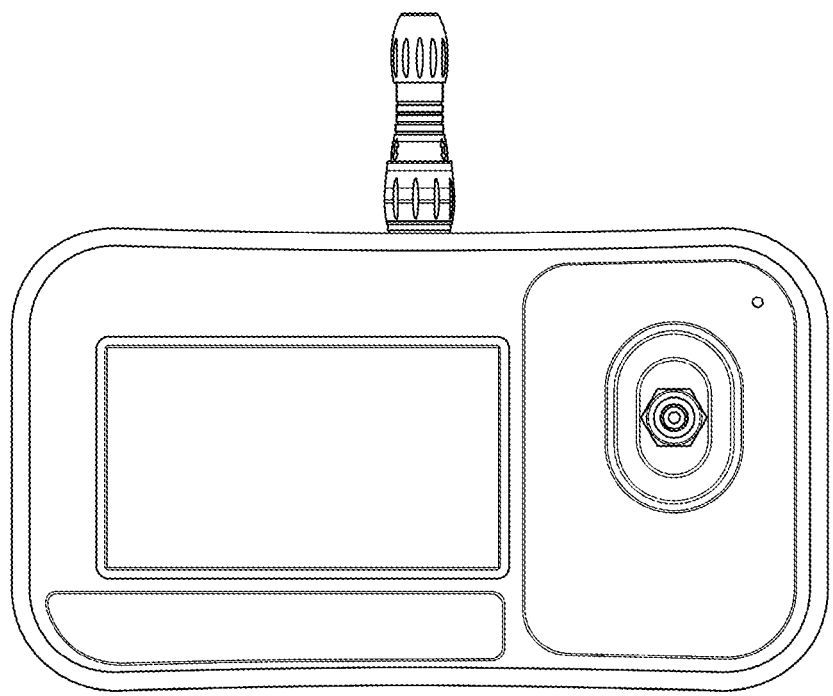
FIG. 6B shows one embodiment of an operator's control device for a conventional retrieval tool.

In one embodiment, the tool comprises an operator's control device 600, one embodiment of which is shown in FIG. 6(b) compared to a prior art control 6(a). As shown, the control provides not only a switch 601 for opening/closing the jaws, but also a display 602 for viewing the camera's image. Having the display and jaw control next to each other facilitates better control over the tool.

In one embodiment, the device is configured with intelligence for reducing power consumption and/or preventing the motor from overheating. For example, in one embodiment, power to the motor is monitored, which is important when grabbing and holding an object in the jaws. More specifically, Applicants recognize that the power required to squeeze the jaws to hold an object is often less than the power required to close the jaws to initially grab the object and dislodge it from its position. Accordingly, in one embodiment, intelligence is provided to monitor the power applied to the jaws and to reduce the power to the minimum necessary to hold the object.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A retrieval device for retrieving items within a confined space with limited access, said device comprising:
    an elongated body having a front and rear and a longitudinal axis;
    a connector disposed at said rear, said connector being configured for connection to at least one cable;
    a clamping mechanism comprising at least a set of jaws disposed at said front, said jaws being configured to actuate between closed and open positions, said clamping mechanism also comprising at least one actuating member connected to said jaws and at least partially disposed in said body;
    a motor laterally offset from said longitudinal axis and beside said at least one actuating member, said motor operatively connected to said at least one actuating member to actuate said jaws between said closed and opened positions, said motor being disposed in said body;
    at least one camera disposed proximate said motor and offset from said longitudinal axis, said at least one camera having a field of view of at least a portion of said jaws;
    at least one light disposed proximate said at least one camera and configured to illuminate said field of view; and
    an operator's control for at least controlling said motor, said operator's control being discrete and remote from said body.

2. The device of claim 1, wherein said jaws define a pivot axis, and said camera is aligned with said pivot axis.

3. The device of claim 1, wherein said at least one camera is configured with a field of view to include at least one of said jaws when in said closed position or space in front of said jaws.

4. The device of claim 3, wherein said field of view comprises both said jaws when in said closed position and said space in front of said jaws.

5. The device of claim 4, wherein said at least one camera comprises a first camera and a second camera, said first camera having a field of view of said jaws when in said closed position, and said second camera having a field of view of space in front of said jaws.

6. The device of claim 4, wherein said at least one camera has an actuatable lens mechanism to provide at least first and second fields of view, said first field of view of said jaws when in said closed position, and said second field of view of space in front of said jaws.

7. The device of claim 6, wherein said jaws define a pivot axis, said pivot axis being essentially perpendicular to said longitudinal axis.

8. The device of claim 1, wherein said jaws comprise a releasable interface configured to releasably engage one of a set of jaw attachments.

9. The device of claim 8, wherein said set of jaw attachments comprises at least one of a cup attachment, a magnet attachment, a noose attachment, thin jaws, wide jaws, curved jaws, straight jaws, or tines.

10. The device of claim 1, wherein said actuating member comprises a scissor mechanism.

11. The device of claim 1, wherein said jaws are configured to rotate around said longitudinal axis.

12. The device of claim 1, further comprising said cable connected to said connector.

13. The device of claim 12, further comprising a handle attached to said cable to facilitate rotating said cable to thereby rotate said body.

14. The device of claim 1, wherein said at least one cable comprises a mechanical cable for maneuvering said body, and an electrical cable for providing at least power to said motor and said camera.

15. The device of claim 14, wherein said mechanical cable is discrete from said electrical cable.

16. The device of claim 1, wherein said operator's control comprises a switch for controlling actuation of said jaws and a display for displaying said field of view.

17. The device of claim 16, wherein said switch and said display are disposed in a unitary control device.

18. A retrieval device for retrieving items within a confined space with limited access, said device comprising:
- a mechanical cable;
- an elongated body having a front and rear and a longitudinal axis;
- a connector at said rear for connecting to said mechanical cable to enable said mechanical cable to maneuver said body within said confined space;
- a clamping mechanism comprising at least a set of jaws disposed at said front, said jaws being configured to actuate between closed and open positions, at least a portion of said clamping mechanism being disposed in said body;
- a motor to actuate said jaws between said closed and opened positions, said motor being within said body;
- at least one camera operatively connected body and having a field of view of at least a portion of said jaws; and
- at least one light operatively connected body and configured to illuminate said field of view.

19. The device of claim 18, further comprising an electrical cable connected to said rear end.

20. The device of claim 19, wherein said mechanical cable is discrete from said electrical cable.

21. The device of claim 18, wherein said jaws define a pivot axis and said camera his aligned with said pivot axis.

22. The device of claim 18, wherein said jaws are configured to rotate around said longitudinal axis.

23. The device of claim 18, further comprising an operator's control for at least controlling said motor, said operator's control being discrete and remote from said body.

* * * * *